United States Patent [19]

Weisberg

[11] 4,110,956
[45] Sep. 5, 1978

[54] APPARATUS FOR FORMING, FILLING AND SEALING BAGS MADE FROM FLATTENED PLASTIC TUBULAR PLASTIC STOCK

[76] Inventor: Warren Weisberg, 2406 Grant, Evanston, Ill. 60201

[21] Appl. No.: 843,477

[22] Filed: Oct. 19, 1977

Related U.S. Application Data

[62] Division of Ser. No. 747,199, Dec. 3, 1976, abandoned.

[51] Int. Cl.² ............................................. B65B 9/10
[52] U.S. Cl. ....................................... 53/558; 53/384
[58] Field of Search .......... 53/29, 384, 180 R, 180 M, 53/182 R, 182 M, 183

[56] References Cited

U.S. PATENT DOCUMENTS

| 3,269,087 | 8/1966 | Cloud et al. | 53/180 X |
| 3,481,102 | 12/1969 | Dolman | 53/183 X |
| 3,529,400 | 9/1970 | Takagaki | 53/182 M |

Primary Examiner—Robert Louis Spruill
Attorney, Agent, or Firm—Wallenstein, Spangenberg, Hattis & Strampel

[57] ABSTRACT

A roll of flattened tubular synthetic plastic stock is unwound by the pulling force of clamping devices mounted on a vertically movable frame and engaging the opposite faces of still flattened portions of the tubular stock. The unwound flattened tubular stock is preferably advanced downwardly between bag slitting, wall separating and bag sealing devices also carried by the framework. A lower pair of clamping members forms a temporary seal along the entire width of the tubular stock at a point adjacent to but above the bottom margin of a bag-forming portion thereof until a permanent seal is formed beneath the same and above another pair of lower clamping members which engage the upper margin of a previously filled bag-forming portion of the same. A lower slitting device slits the bag between the latter pairs of clamping members while the clamping members are in operative position. The framework is moved bodily between an uppermost position where a spout-receiving slit is formed by an upper slitting device in portions of the tubular stock to constitute or to be located adjacent to the upper margin of a bag to be formed therein, and the confronting walls of the portion of the tubular stock at and below the slit are separated preferably by engagement therewith by a pair of spaced pointed projections which bite into the bag and are then moved apart to separate the walls. One or more spouts carried by the framework are then passed downwardly through the slit as the framework, with all the other devices carried thereby, is moved bodily downwardly to a bottommost position while the sealed interior of the bag-forming portion of the tubular stock is filled. A permanent bottom seal is formed and the lower clamping members are released to free the previously filled bag-forming portion of the stock which drops by force of gravity onto a receiving platform or the like. Bags of different length are formed by merely varying the distance between the uppermost and bottommost positions of the framework.

6 Claims, 14 Drawing Figures

APPARATUS FOR FORMING, FILLING AND SEALING BAGS MADE FROM FLATTENED PLASTIC TUBULAR PLASTIC STOCK

This is a division of application Ser. No. 747,199, filed Dec. 3, 1976, now abandoned.

BACKGROUND OF THE INVENTION

The present invention relates to a method and an apparatus for forming, filling and sealing synthetic plastic bags containing most preferably liquid contents, although the present invention is applicable also to filling bags with powder and similar materials.

The fabrication of synthetic plastic bags filled with liquid has caused problems in the past because of the ready breakage of the seals thereof under the strains applied to the walls of the plastic bags. When the bags are placed one on top of the other where the buttommost bags must support the weight of the bags thereabove, or in those instances where the bags are dropped, the rupturing of the seals of the bags are not an uncommon occurrence. One of the reasons for the rupture of the bags is due to the difficulty of making secure heat seals between the confronting walls of the bags.

The plastic sheets from which plastic bags are made are generally formed by extruding the plastic material through a thin orifice. Bags are commonly formed from such extruded plastic material by wrapping the sheet around a mandrel or by placing two sheets in confronting relationship and heat sealing the confronting edges thereof. It is known that when the heat seals run in the direction in which the plastic material was extruded, the resulting seal is appreciably weaker than seals formed at right angles to the extrusion direction thereof. The avoidance of seals running in the direction of the extrusion of the plastic material is achieved by forming the bags from tubular plastics stock so the only seals which are formed extend transversely of the extrusion direction. In such case, filled sealed bags can be formed by severing a section thereof from the tubular stock of material involved, forming a seal at the bottom end thereof, filling the bag from the top thereof and then sealing the top of the bag. U.S. Pat. No. 3,492,775 to Rhine et al. and U.S. Pat. No. 3,760,558 to Kaminsky et al. show two examples of apparatus for forming, filling, and sealing individual bags formed on the end portion of an initially flattened tubular plastic stock. In the apparatus involved in these patents, rather complex mechanical means are located within the tubular stock pulled thereover for the purpose of separating the initially flattened walls of the plastic stock so it can receive a spout for filling the same, and also for isolating portions of the bag to be sealed from the material being injected into the same. Such mechanical means are relatively complex and expensive to manufacture and not readily useable when the bags are to be filled with liquid materials, and generally are not adaptable by adjustment to make bags of greatly different lengths. Also, because of the mode of operation of these prior bag forming, filling and sealing apparatus there were undersired limitations on the rate at which the bags could be formed, filled and sealed. In the case where liquid is the filling material, such material coating the mechanical means could drip upon portions of the stock to be sealed and prevent proper seal formation.

It is, accordingly, one of the objects of the present invention to provide a method and an apparatus for fabricating, filling and sealing individual plastic bags from the end portions of a strip or roll of flattened extruded tubular synthetic plastic material and which further is of much less complexity and greater reliability than the apparatus heretofore used for this purpose.

A related object of the invention is to provide apparatus for forming, filling and sealing plastic bags formed from the end portions of flattened tubular stock of synthetic plastic material which does not require the insertion of any apparatus into the tubular stock, except for one or more filling spouts. A related object of the invention is to provide a method and an apparatus as described which can be readily adapted to make bags of varying lengths and with secure seals in all cases.

Another object of the invention is to provide apparatus for forming, filling and sealing plastic bags formed from the end portions of flattened tubular stock of synthetic plastic material which can produce separate filled bags at a much higher rate than the prior art apparatus.

SUMMARY OF THE INVENTION

In the most preferred form of the present invention, a roll of flattened extruded tubular synthetic plastic material is unwound and intermittently advanced along a vertical path by the pulling force of clamping devices most preferably carried along with other devices to be described on a framework which moves between uppermost and bottommost positions. The clamping devices carried by the framework preferably engages the flattened tubular stock at spaced points respectively adjacent the upper and lower margins of a bag to be formed from the tubular stock. A lower clamping device engaging the tubular stock adjacent the lower margin of the bag to be formed most advantageously forms a temporary liquid-tight seal between the confronting walls thereof. The framework carries adjacent the uppermost margin of a bag being formed on upper bag slitting device and a wall-separating device which engages the exterior walls of the flattened tubular stock and pulls the same apart when moved to relatively spaced apart positions. The framework also carries one or more filling spouts mounted for up and down movement thereon between an upper position where they are spaced from the tubular stock and a lowered position where the spouts extend though a slit formed thereby by said upper slitting device, into the tubular stock whose walls are separated by said wall separating device.

The framework also carries a sealing device which forms vertically spaced heat sealing areas extending completely across the tubular stock at point below said clamping device which forms a temporary seal adjacent the bottom margin of the bag. The framework further carries a lower bag slitting device for forming a continuous slit across the width of the tubular stock at a point between the area said heat seals are formed in the tubular stock. Most advantageously a lowermost clamping device which clamps against the opposite sides of the tubular stock is provided at a point immediately below said sealing device so that the lower sliting device can move between said lower clamping devices against and then retracted from the tubular stock without the stock sticking to the retracting cutting edge of the lower slitting device.

In accordance with one of the basic features of the present invention which do not require the presence of all of the features of the preferred form of the bag forming, filling and sealing apparatus of the invention just described, after said upper slitting device and said bag wall separating device have respectively formed a slit at a point in the tubular stock to be located in the upper region of a bag to be formed therefrom and the walls of the tubular stock at and below the slit have been separated, said spout or spouts are inserted into the tubular stock through said slit and a bag filling operation is initiated or completed and the framework carrying said spouts and clamping devices is moved bodily downward a little more than a one bag length distance, while said clamping devices continue to engage flattened portions of said tubular stock on opposite sides thereof. This creates a pulling force for unwinding the tubular stock from the roll of the same. Since the tubular stock is engaged by said clamping devices at points adjacent to the upper and lower margins of the bag to be formed thereby, stresses on the walls of the tubular stock beyond the clamping devices is minimized during the downward movement of the framework when the bag is filled.

In accordance with another basic feature of the invention, the filling spouts are movable and carried by said framework and fill the portion of the tubular stock above the seal-forming clamping device during the downward movement of said framework, so that the filling operation does not take additional time, thereby reducing the manufacturing time to form, fill and seal a bag.

In accordance with another feature of the invention, during the downward movement of said framework, vertically spaced heat seals are formed by said heat sealing device. One of said seals are formed immediately below said lower temporary seal-forming clamping device to permanently close off the bottom of a bag being formed and filled before release of the latter clamping device. The other seal is formed below said lowermost clamping device to seal the top of a previously filled portion of the tubular stock which will form a separate bag. The heat sealing device is withdrawn from the tubular stock preferably before said framework reaches its bottommost position at which time the heat seals have cooled to a point where the weight of the material above the same will not break the seal. Said clamping devices can then be released from the tubular stock to permit the previously filled bag to be completely separated from the tubular stock. It should be appreciated that, unlike the prior art filling devices, neither the filling spouts nor any other mechanical means are located within the tubular stock at a time where any liquid or other filling material can drip upon or transfer such material to a portion of the tubular stock subsequently to be engaged by the sealing means and so perfect seals can be formed by the sealing means.

In accordance with a further feature of the invention during the downward movement of said framework, said lower bag slitting device is operatively moved against and then away from the tubular stock to form a complete separation of the previously bottom sealed, filled, end portion of the tubular stock, so that the resulting completed bottommost bag will drop by force of gravity when said lowermost clamping device is released therefrom when said framework has reached said bottommost position. Following the release of said clamping devices from the fully lowered framework, the framework is then returned to its uppermost position where the above described sequence of operations of the various devices are repeated.

It should be appreciated that the mode of operation of said framework and the devices carry thereby during the movement of the framework between said uppermost and lowermost position results in a maximum possible rate of fabrication of filled, sealed plastic bags from the flattened tubular stock. Also, the only devices which are positioned inside the tubular stock are the material filling spouts, which clearly reduces the complexity of the apparatus involved in comparison to the prior bag forming, filling and sealing apparatus, which require the flattened tubular stock to be pulled over and around various bag separating and masking devices. Moreover, the length of the bags made by the method and apparatus of the present invention can be varied simply by varying the distance between the uppermost and lowermost positions of the framework and perfect seals are always formed on perfectly dry stock surfaces. The width of the bags can vary in size without parts changes to the length of the various sealing and changing methods.

DESCRIPTION OF EXEMPLARY EMBODIMENT OF THE INVENTION

Figures 1, 5:
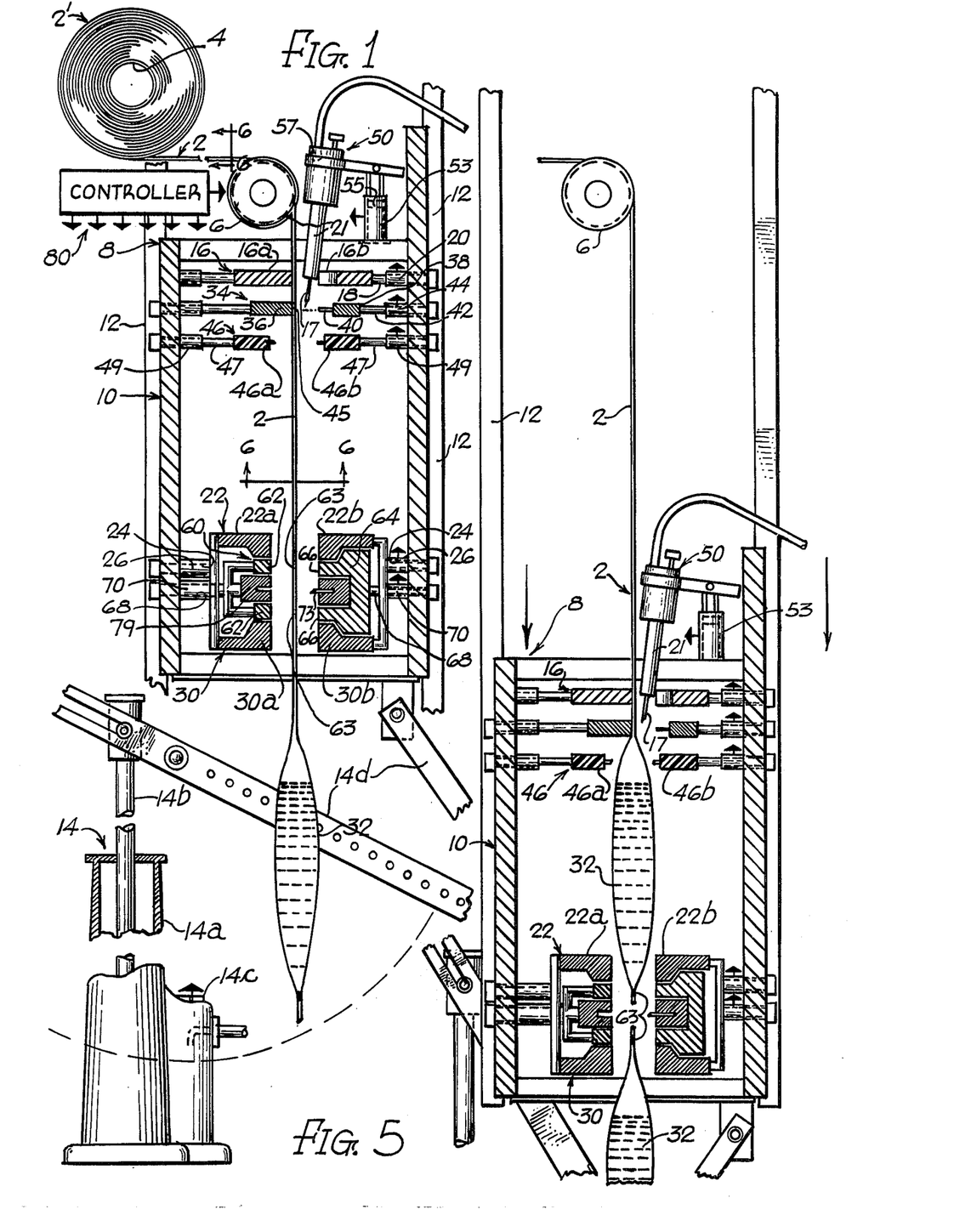
FIG. 1 is a vertical sectional view of the bag forming, filling and sealing apparatus of the present invention in position to begin operation upon the vertically downwardly extending end portion of the unwound portion of flattened tubular stock of synthetic plastic material.
FIG. 5 is a full scale view of the apparatus shown in FIG. 4, showing the final step in the operation of the apparatus of FIGS. 1 through 4, wherein framework carrying the various devices described has reached a bottommost position, and wherein said clamping devices have been released, from the tubular stock permitting a completely formed, sealed, and previously filled bag to drop from the bottom of the tubular stock.
Figure 6:
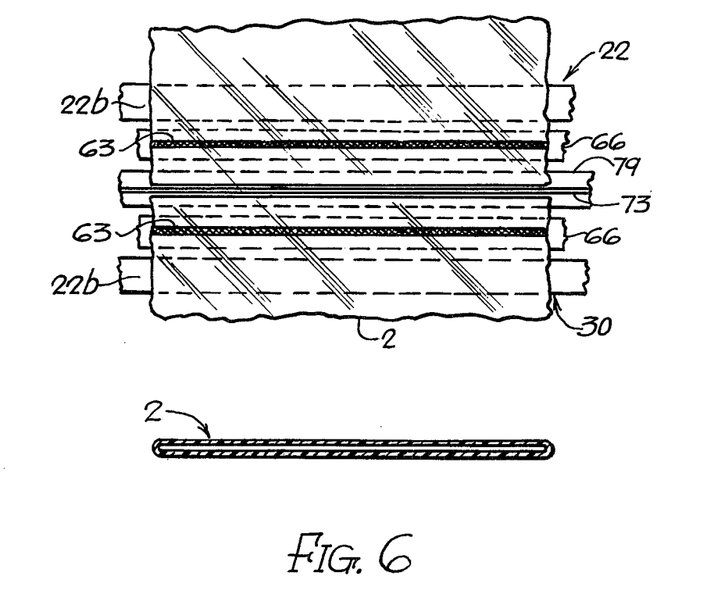
FIG. 6 is an enlarged sectional view through the flattened tubular stock, taken along section line 6—6 in FIG. 1.

Referring now to the drawings, a roll 2' of flattened tubular stock 2 of a suitable bag-forming synthetic plastic material is shown mounted for rotation on a hub 4. The tubular stock was formed by an extrusion operation to form a continuous wall structure, as shown by the transverse sectional view therethrough in FIG. 6. An unwound portion of the tubular stock 2 is shown extending first horizontally and then vertically downwardly over an idler roll 6, where it enters the bag forming, filling and sealing apparatus 8 of the invention.

While the apparatus 8 may take a variety of forms, as illustrated, it includes a common support framework 10 mounted for vertical sliding motion between vertical guide-forming walls 12—12. The framework is moved first downwardly from its uppermost position shown in FIG. 1 by motion-imparting means which may include a hydraulically operated piston-containing cylinder 14a having a vertical piston rod 14b secured to the framework 10 and a suitable solenoid operated valve 14c or the like for controlling the hydraulic fluid which reciprocates the piston rod 14b downwardly and upwardly a distance equal to one bag length. Either by making the throw of the piston rod 14b adjustable or by utilizing an adjustable linkage means 14d operated by the piston rod 14b, the distance moved by the framework 10 between its uppermost and lowermost positions can be readily varied to produce bags of a variety of lengths.

Figure 4:
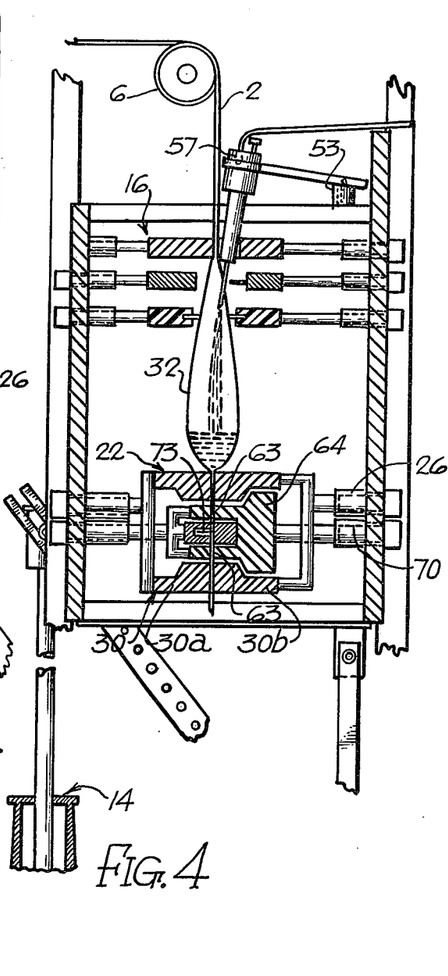
FIG. 4 is a view corresponding to FIG. 3 showing the entire apparatus of FIGS. 1 through 3 being moved bodily downward, while the filling of a bottom sealed portion of the tubular stock proceeds and the sealing and a lower bag slitting devices have been brought into operative engagement with the tubular stock.
Figure 4A:
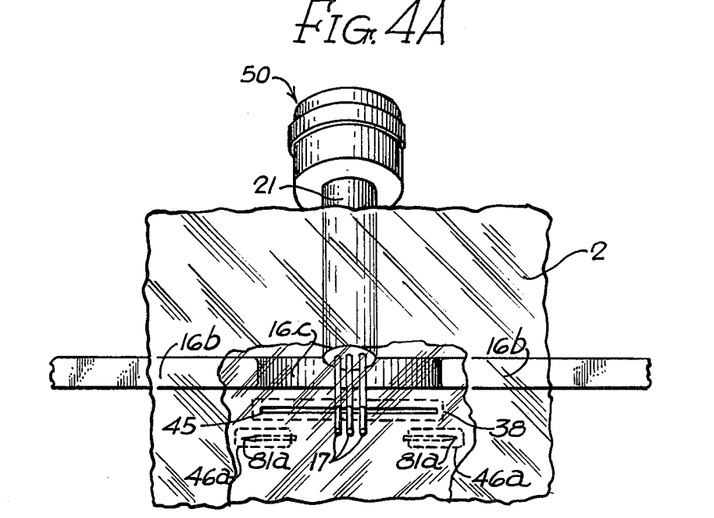
FIG. 4A is an enlarged fragmentary, sectional view of the apparatus in FIG. 3, partly broken-away, seen along section line 4A—4B in FIG. 4.

The framework 10 supports a number of different devices to be described which perform various operations upon the vertically downwardly extending portion of the tubular stock 2, to form sealed liquid-filled bags in a very time efficient, simple and reliable manner. Accordingly, the framework 10 has mounted thereon an upper clamping device 16 comprising a stationary clamping member 16a and a horizontally movable clamping member 16b. When the movable clamping member 16b is moved to the left to is fullest extent, it tightly clamps the adjacent flattened portion of the tubular stock against the adjacent clamping member 16a. The movable clamping member 16b may be carried on an armature or rod 18 of a suitable motion-imparting device 20, which may be a solenoid or the like. The movable clamping member 16b, as best shown in FIG. 4A, may comprise a pair of horizontally spaced sections 16b—16b which directly engage the tubular stock and a bridging section 16c connected to the rod 18 and positioned outwardly from the clamping member 16b—16b to leave a space for the passage thereby of a series of filling spouts 17 therebetween.

The framework 10 also includes a lower clamping device 22 which, as illustrated, comprises a stationary clamping member 22a and a horizontally movable clamping member 22b carried on the end of an armature or rod 24 of a suitable motion-imparting device 26. The clamping members 22a—22b extend the full width of the widest tubular stock to be handled by the apparatus 8, and when moved to its left-hand position it clamps the adjacent flattened portion of the tubular stock 2 against the corresponding clamping member 22a to form a liquid-tight seal along the entire width thereof. The lower clamping device 22 is positioned somewhat above but in the general vicinity of what will become the lower margin of a bag to be formed in the tubular stock 2.

There is provided a lowermost clamping device 30 spaced beneath the lower clamping device 22, the clamping device 30, as illustrated, comprising a stationary clamping member 30a and a horizontally movable clamping member 30b coupled to the end of the horizontally movable armature or rod 24 which also carries the movable clamping member 22b of clamping device 22. The movable clamping members 22b and 30b thus move in unison between clamping and released positions. The lowermost clamping device 30 clamps tightly a flattened portion of the tubular stock 6 located somewhat below the upper margin of a bottommost filled bag 32 shown in FIG. 1, which was filled during the immediately previous cycle of operation of the apparatus 8.

The framework 10 carries an upper bag slitting device 34 which includes a stationary backing member 36 and a horizontally movable member 38 form which horizontally projects a slit-forming projection 40. The movable member 38 is carried on the end of a horizontally movable armature or rod 42 of a suitable motion-imparting device 44 which, when energized, moves the movable member 38 to the left of the position shown in FIG. 1 to form a spout receiving slit 45 (see FIG. 4A) on the adjacent portion of the tubular stock 2 at a point positioned a small distance below the upper clamping device 16.

The framework 10 further carries a wall separating device 46 which comprises left and right hand tubular stock engaging portions 46a-46b which are carried on movable members 47—47, in turn, coupled to motion-imparting means 49—49 which, when energized, move the stock-engaging portions 46a-46b adjacent one another to cause the same to grasp the adjacent oppositely facing surfaces of the tubular stock. When the stock-engaging portions 46a-46b are moved apart they separate the walls of the tubular stock at and immediately below the portion of the tubular stock 6 in which the spoutreceiving slit 45 is formed.

The framework 10 further carries the one or more horizontally-spaced vertical spouts 17 attached to a common head 52. The filling device 50 is mounted for up and down movement relative to the framework 10 of which it is carried and is connected to a suitable motion-imparting means, such as a hydraulically operated device 53, controlled by a control valve 55, and a filling control valve 57 is provided which controls the flow of liquid to the filling spouts 17. In the lowermost position of the filling spouts, they extend downwardly into the slit 45 formed in the tubular stock.

The framework 10 further carries a heat sealing device 60 comprising a pair of vertically spaced stationery backing members 62—62 and a heating head 64 having vertically spaced heat sealforming tubular stock engaging projecting portions 66—66. The heat sealing head 64 is mounted for horizontal movement upon an armature or operating rod 68 associated with a suitable motion imparting device 70 which, when energized, moves the heating head 64 to the left to bring the projecting portion 66—66 thereof against the tubular stock to press the same against the backing members 62—62 to form horizontally extending heat seals 63—63 (FIG. 4A) extending across the complete width of the tubular stock involved. The heat seals are preferably formed at points respectively immediately below and above the movable clamping members 22b and 30b to form heat seals respectively adjacent to the bottom margin of the portion of the tubular stock being filled at the time involved and at the upper end at the bottommost previously filled bag 32.

The movable heating head 64 also carries a horizontally extending slitting blade 73 projecting outwardly between the heatsealing forming projections 66—66 of the heating head 64. When the heating head is moved to the left to perform a heat-sealing-operation, the blade 73 forms a continuous slit 74 extending the entire width of the tubular stock involved, completely to separate the previously filled bag 32 from the tubular stock thereabove. The slitting blade 73 is adapted to pass within a guide slot formed by a stationary backing member 79 carried by the framework 10. Obviously, the position of the blade 73 and slit can be reversed.

For an explanation as to the particular sequence of operation of the various devices described in the preferred form of the present invention, reference should now be made to FIGS. 1 through 6 showing the six basic steps of operation of the apparatus 8 in a cycle of operation beginning with the framework 10 positioned in its uppermost position shown in FIG. 5, and ending when the framework 10, after being moved downwardly approximately one bag length into the position shown in FIG. 1, is returned back to the uppermost position shown in FIG. 1 to begin a new cycle of operation. At the beginning of each cycle of operation, when the framework 10 has been returned to its uppermost position shown in FIG. 1, all of the devices involved are in their inoperative positions. Thus, the spouts 17 are in their upper position spaced from the tubular stock, the clamping members 16b, 22b and 30b, the upper slitting projection 40, the slitting blade 73, and the heating head 64 of the heating device 60 are all in their right-hand positions, as illustrated in FIG. 1. Also, the tubular stock engaging portions 46a–46b of the wall separating device 46 are in their spaced apart positions. The various motion imparting devices described, which control the movement of the various movable elements operating upon the tubular stock tube, are controlled in a given sequence in any suitable way. FIG. 1 illustrates diagrammatically a controller 80 which may comprise electronic or camoperated switches or the like which control in a predetermined sequence, the energization and de-energization of the various motion-imparting devices shown.

Figures 2, 3:
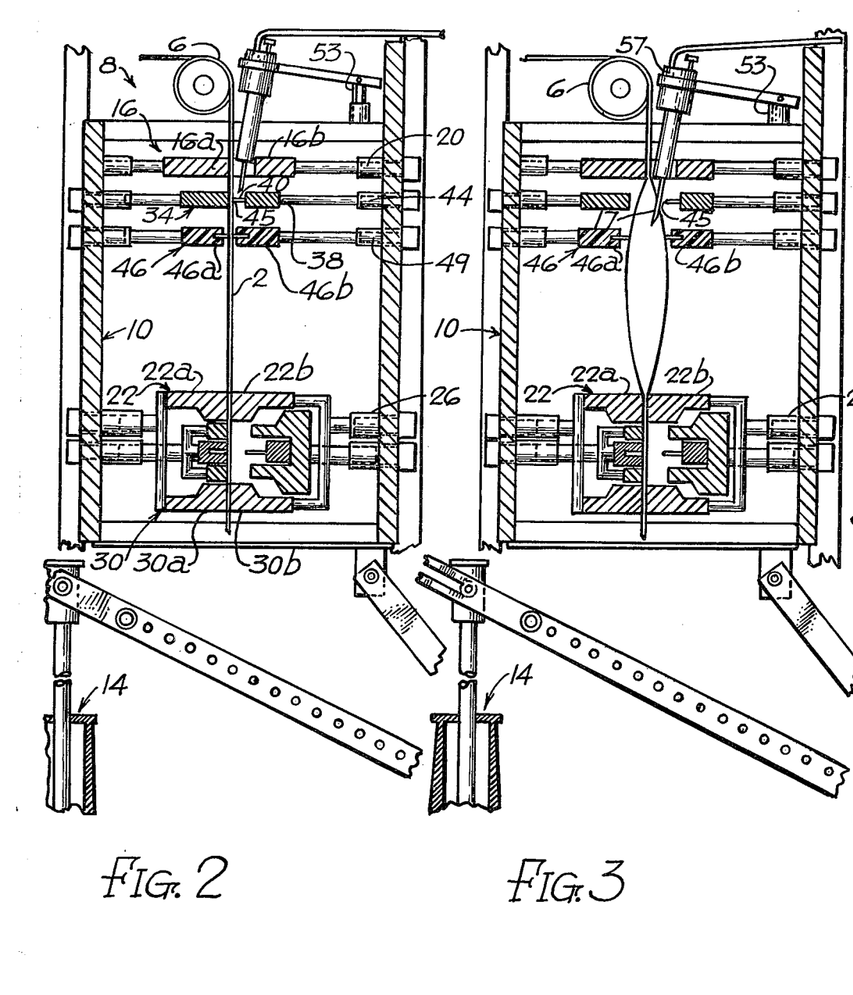
FIG. 2 is a reduced scale view showing the first step in the operation of the apparatus shown in FIG. 1, wherein the stock clamping, slitting and wall separating devices thereof are brought into operative engagement with the tubular stock.
FIG. 3 is a view corresponding to FIG. 2 showing the next step in the operation of the apparatus wherein the filling spouts are moved into the slit formed by the slitting device shown in FIG. 2.

The first operation performed on the tubular stock is illustrated in FIG. 2 which shows the clamping member 16b of the upper clamping device 16 and the clamping members 22b and 30b of the lower clamping devices 22 and 30 moved to the left upon operation of the associated motion-imparting means 20 and 26, to clamp the tubular stock against the associated backing members 16a, 22a, and 30a. Also, the member 38 carrying the bag-slitting projection 40 is moved to the left to cut the aforementioned slit 45 (FIG. 4A) in the right hand wall of the tubular stock 2 upon the energization of motion imparting means 44. The slit 45 is formed at a point adjacent to the upper margin of a bag to be formed from the tubular stock. The motion-imparting means 49 of the wall separating device 46 is momentarily energized which brings the wall engaging portions 46a–46b of the wall separating device 46 into grasping engagement with the flattened confronting walls of the tubular stock 6 at a point below the slitting device 34 and then separates them to pull the walls of the tubular stock far apart to open the slit 45. The sandwiching of the tubular stock 2 between the lower pair of clamping members 22a and 22b forms a liquid-tight seal along the entire width of the tubular stock 2 at a point spaced slightly upwardly but contiguous to the bottom margin of a bag being formed from the tubular stock 2 to enable a bag filling operation to commence before any permanent seals are formed in the tubular stock.

The next step in the operation of the apparatus 8 is shown in FIG. 3 where the tubular stock engaging-portions 46a–46b of the wall separating device 46 are shown in their spaced positions to spread apart the walls of the tubular stock at and below the slit 45 to permit the ready passage of the spouts 17 into the tubular stock to enable a filling operation to be initiated. Thus, motion imparting means 53 associated with the spouts 17 is energized to lower the spouts which enter the interior of the tubular stock 2 through the slit 45.

Either simultaneously with the movement of the spouts 17 downwardly or immediately thereafter, the motion imparting means 14 which operates the framework 10 is energized to lower the framework 10 to a lowermost position. The filling control valve 57 is then opened to permit the passage of a desired amount of liquid into the tubular stock 2. As the framework 10 moves downwardly as shown in FIG. 4, the heating head 64 is moved to the left upon operation of motion-imparting means 70 to form the heat seals 63 and 63 described and to move blade 73 to the left to severe the tubular stock at a point between the heat seals while the clamping devices 16, 22 and 30 remain in their clamping positions. The heating head 64 is only momentarily moved into its sealing position, whereupon the heating head is withdrawn from the tubular stock along with the slitting blade 73, which is readily pulled from engagement with the tubular stock since the still operating clamping devices 22 and 30 prevent the tubular stock from sticking to the slitting blade 73.

When the framework 10 reaches its bottommost position as shown in FIG. 5, the clamping devices 16, 22, and 30 are released, permitting the already severed bottommost previously filled bag 32 to drop by force of gravity upon a discharge platform or conveyor. The upper heat seal 63 has then cooled sufficiently so that it forms a secure seal to support the weight of the liquid filling the portion of the tubular stock above the same. At the same time, in any suitable manner, the engagement of the stock engaging-portion 46a–46b of the wall separating device 46 with the tubular stock is then released therefrom. To this end, if the stock engaging-portion 46a–46b are vacuum holding heads, which is a decidedly less preferred form of the invention, then the vacuum is merely disconnected therefrom. In the preferred form of the invention, the stock engaging-protion 46a–46b include sharp projections which bite into and securely engage the tubular stock until their release from the tubular stock in a manner to be described in connection with the description of FIG. 7A through 9, which illustrates a preferred wall separating device usable with the invention just described. Also, the motion-imparting means 53 associated with the spouts 17 is de-energized so that the spouts 17 are withdrawn from within the tubular stock 2.

The cycle of operation of the apparatus 8 is terminated as the framework 10 is returned to its uppermost position, which it can freely do without imparting any forces on the tubular stock because at the end of step 5 shown in FIG. 5 just described, none of the various devices described is in engagement with the tubular stock.

Figure 7A:
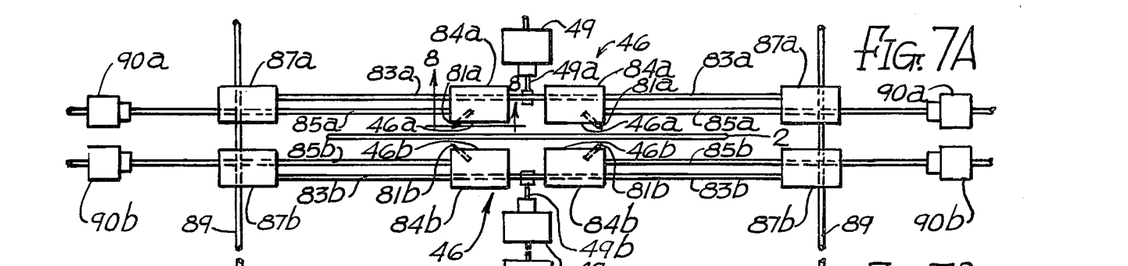
FIG. 7A, 7B, 7C, 7D, 7E is a plan view of details of a preferred wall separating device shown in a more simplified form in FIGS. 1 through 6, and showing respectively the different relative positions of the parts thereof during the various sequences of operation thereof.
Figure 7B:
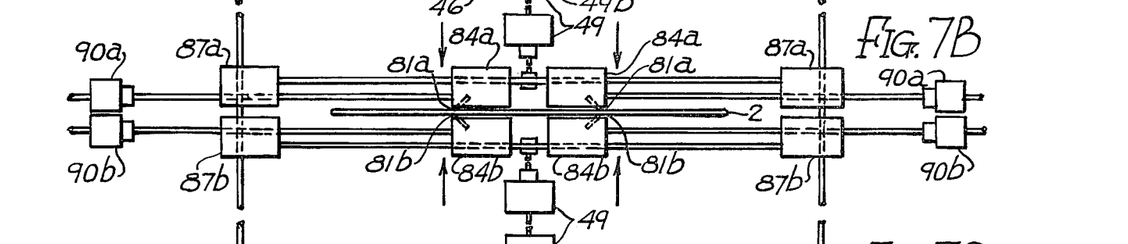
Figures 7C, 7D:
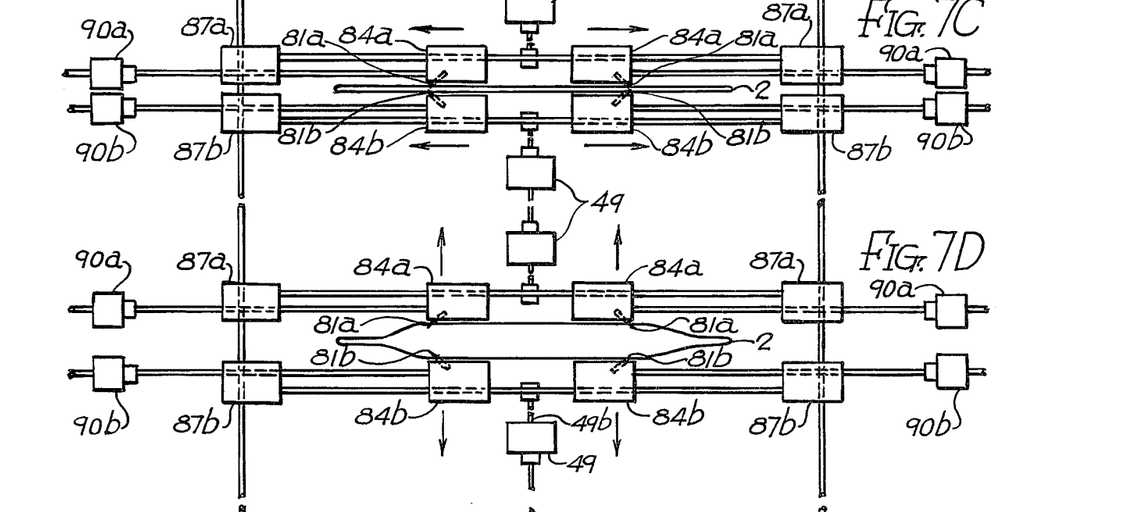
Figure 7E:
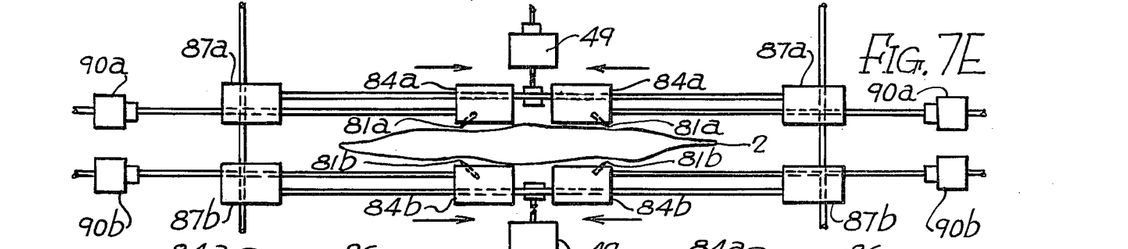

Refer now to FIG. 7A through 7E, FIG. 8, and FIG. 9 which shows a preferred form of wall separating device 46. As thereshown, the tubular stock engaging portions 46a-46b thereof comprise first and second pairs of tubular stock-impaling projections 81a—81a and 81b—81b respectively positioned to bite into the opposite sides of the flattened portion of the tubular stock when said pairs thereof are brought into closely spaced relation as shown in FIG. 7B from their initial separated positions as shown in FIG. 7A. Each of the pairs of projections 81a—81a and 81b—81b as shown, comprise sharply pointed metal pins or the like inclined in opposite directions away from each other and toward the tubular stock 2. The pair of metal pins 81a—81a and 81b—81b are respectively carried by inner pairs of support blocks 84a—84a and 84b—84b, which may be made of wood, plastic material or the like. Each block 84a and 84b has a recess 86 in which a metal pin is anchored. The pointed end of each pin is located adjacent the outer surface of the block where there is a clearance space 88 which allows the material of the tubular stock to gather at this point, resulting in a better holding action. The inner blocks 84a—84a and 84b—84b are guided for sliding movement upon guide rods 83a and 83b respectively extending between and anchored to associated outer blocks 87a—87a and 87b—87b. Support rods 85a—85a and 85b—85b are secured to and respectively extend outwardly from the pairs of inner blocks 84a—84a and 84b—84b and slidably pass through the associated outer blocks 87a—87a and 87b—87b where the rods respectively connect to movable armatures or rods of motion-imparting means 90a—90a or 90b—90b. When the motion-imparting means 90a—90a and 90b—90b are energized, the associated support rods 85a—85a and 85b—85b are drawn outwardly to move the tubular stock-impaling pins 81a 81a and 81b—81b outwardly to cause the pointed ends of the pins to bite into the walls of the tubular stock.

The outer blocks 87a—87a and 87b—87b are guided for sliding motion upon guide rods 89—89 extending transversely to the aforementioned pairs of support rods 85a—85a and 85b—85b. Connections 49a—49b are shown between the guide rods 83a and 83b and the aforementioned motion-imparting means 49—49 which, when energized cause the guide rods 83a and 83b to move between the relatively initially spaced apart positions shown in FIG. 7A to the relatively closely spaced apart positions shown in FIG. 7B, causing the outer block 87a—87a and 87b—87b to slide along the guide rods 89—89 and move the inner blocks so that their pins 81a—81a and 81b—81b are moved against the tubular stock 2.

Figure 8:
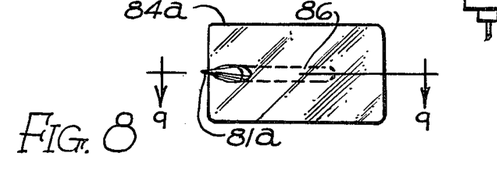
FIG. 8 is a side view of a portion of the wall separating device shown in FIG. 7A, as seen along viewing plane 8—8 therein.
Figure 9:
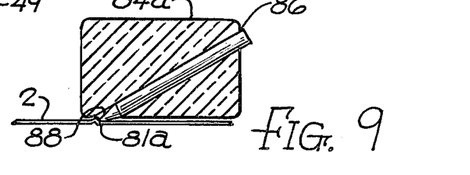
FIG. 9 is a sectional view through FIG. 8 taken along section line 9—9 therein.

The sequence of movement of the various portions of the wall separating device 46 just described are as follows. Initially, with the pairs of pins 81a—81a and 81b—81b in their relatively closely spaced apart positions shown in FIG. 7A, motion imparting means 49—49 are energized to cause the pins to move toward one another to engage the opposite sides of the tubular stock, as shown in FIG. 7B. Next, the motion-imparting means 90a—90a and 90b—90b are energized to draw the inner parts of blocks 84a—84a and 84b—84b outwardly to cause the pointed ends of the pins carried thereby to bite into the walls of the tubular stock to impale the same, as shown in FIG. 8. Next, the motion-imparting means 49—49 are operated to return their armatures or rods 49a—49a to their initial positions, where the inner pairs of blocks 84a—84a and 84b—84b are in their relatively spaced apart positions, where the pairs of pins 81a—81a and 81b—81b are moved apart to separate the walls of the tubular stock impaled thereon. The pins are released from the walls of the tubular stock by de-energizing the motion-imparting means 90a—90a and 90b—90b which moves the inner pairs of blocks 84a—84a and 84b—84b and their pins close together.

The bag separating means just described has utility not only in separating bag walls but in moving other walls of flexible material from one position to another.

It should also be understood that numerous modifications may be made in the exemplary and most advantageous and preferred form of the invention described without deviating from the broader aspects of the invention.

I claim:

1. In apparatus for forming, filling and sealing bags made from a roll of a flattened strip of extruded synthetic plastic tubular stock, said apparatus including upper bag slitting means for forming a spout-receiving slit in a first portion of the tubular stock fed thereto which portion is adjacent the upper margin of a sealed bag to be formed therefrom, lower bag slitting means for forming a slit completely across the tubular stock in a second portion of the tubular stock which will constitute the bottom margin of a sealed bag being formed at a given time, wall separating means for spacing apart the confronting walls of the flattened tubular stock at and below the slit formed by said upper bag slitting means, filling means movable into and out of said slit formed in the tubular stock for filling the same with material, and means for forming seals completely across portions of the tubular stock to be positioned adjacent the upper and lower margins of a bag to be formed therefrom, the improvement comprising tubular stock advancing means for intermittently advancing an unwound portion of said roll of tubular stock in a downward direction to bring successive portions thereof into position to be operated upon by said bag slitting, wall spearating, filling and sealing means, said tubular stock advancing means comprising an upper pair of clamping means movable into and out of clamping relationship with flattened portions of said tubular stock at points adjacent to what will become the upper margin of a bag, said upper pair of clamping means engaging the tubular stock at points above the point where said slit is formed, and means following the insertion of said filling means into said tubular stock through said slit for bodily moving said upper pair of clamping means downwardly so the clamping means pulls the tubular stock downwardly to unroll said roll to tubular stock and advance the same at least one bag length, said upper pair of clamping means relieving said tubular stock at a point above said upper pair of clamping members from the weight of the material filling the portion of said tubular stock above the point where a seal is formed by said sealing means.

2. The apparatus of claim 1 wherein sid filling means is supported for movement bodily with said upper pair of clamping means, and means for feeding material through said filling means to fill the portion of the tubular stock above the bottommost of said seals formed therein as said upper pair of clamping means moves bodily downwardly together with said filling means.

3. The apparatus of claim 1 wherein there is provided a lower pair of clamping means spaced below said upper pair of clamping means to engage the flattened tubular stock at a point below the point where said slit is formed and above the point where a permanent liquid-tight seal completely across the lower portion of a bag is to be formed in said tubular stock and thereafter to move said lower pair of clamping means away from said tubular stock after the last mentioned permanent seal is formed, and means for moving said lower pair of clamping means against said bag to form a temporary seal thereacross as said bag is filled and before said sealing means forms a permanent seal therebelow.

4. The apparatus of claim 3 wherein there is provided a second slitting means for forming a continuous slit across substantially the entire width of the tubular stock and a second lower pair of clamping means for engaging the tubular stock at points spaced vertically below the first mentioned pair of lower clamping means for moving said second slitting means into and out of slitting engagement with the tubular stock at points between said vertically spaced pairs of lower clamping means while said lower pairs of clamping means are in engagement with the tubular stock, whereby, said sealing means forms a heat seal across the entire width of the tubular stock at points on opposite sides of the point where said second slitting means forms said slit across the entire width of the tubular stock and to form an upper seal for a previously filled portion of the tubular stock and a bottom seal for the portion of the tubular stock thereabove, and whereby upon release of the lower pairs of clamping means from said tubular stock after formation of said heat seals and slit across the tubular stock a bottommost sealed filled bag will separate and drop from the portion of the tubular stock thereabove.

5. The apparatus of claim 3 wherein at least said filling means, upper and lower pair of clamping means and said sealing means are mounted for bodily up and down movement together, and there is provided control means for effecting the operation of said filling means and said sealing means while said upper and lower pair of clamping means are operatively moving the tubular stock downwardly at least one bag length.

6. The apparatus of claim 1 wherein said wall separating means includes first and second pairs of outwardly angularly projecting means on opposite outer sides of the tubular stock, said first and second pairs of projecting means are mounted for movement transversely of the walls of said tubular stock between relatively closely and relatively widely spaced apart positions, and each pair of projecting means are mounted also for movement relative to one another parallel to said walls between relatively closely spaced and relatively widely spaced positions; and means for moving said respective pairs of projecting means first transversely of said walls between said relatively widely spaced apart to said relatively closely spaced apart positions while each pair of projection means is in said relatively closely spaced apart positions relative to one another, so that the projection means project into the walls of the tubular stock, and, thereafter, for first moving each pair of projection means to said relatively widely spaced apart positions, so the pair of projection means bite into said walls, then moving said pairs of projecting means transversely outwardly into said relatively widely spaced apart positions where the projecting means biting into the tubular stock walls separate such walls, and finally for returning each pair of projecting means into said relatively closely spaced apart positions where said projecting means lose biting engagement with said walls.

* * * * *